July 1, 1941.  C. C. HAAS  2,247,681
CONNECTION FOR PLANTERS TO TRACTORS
Filed Jan. 28, 1939
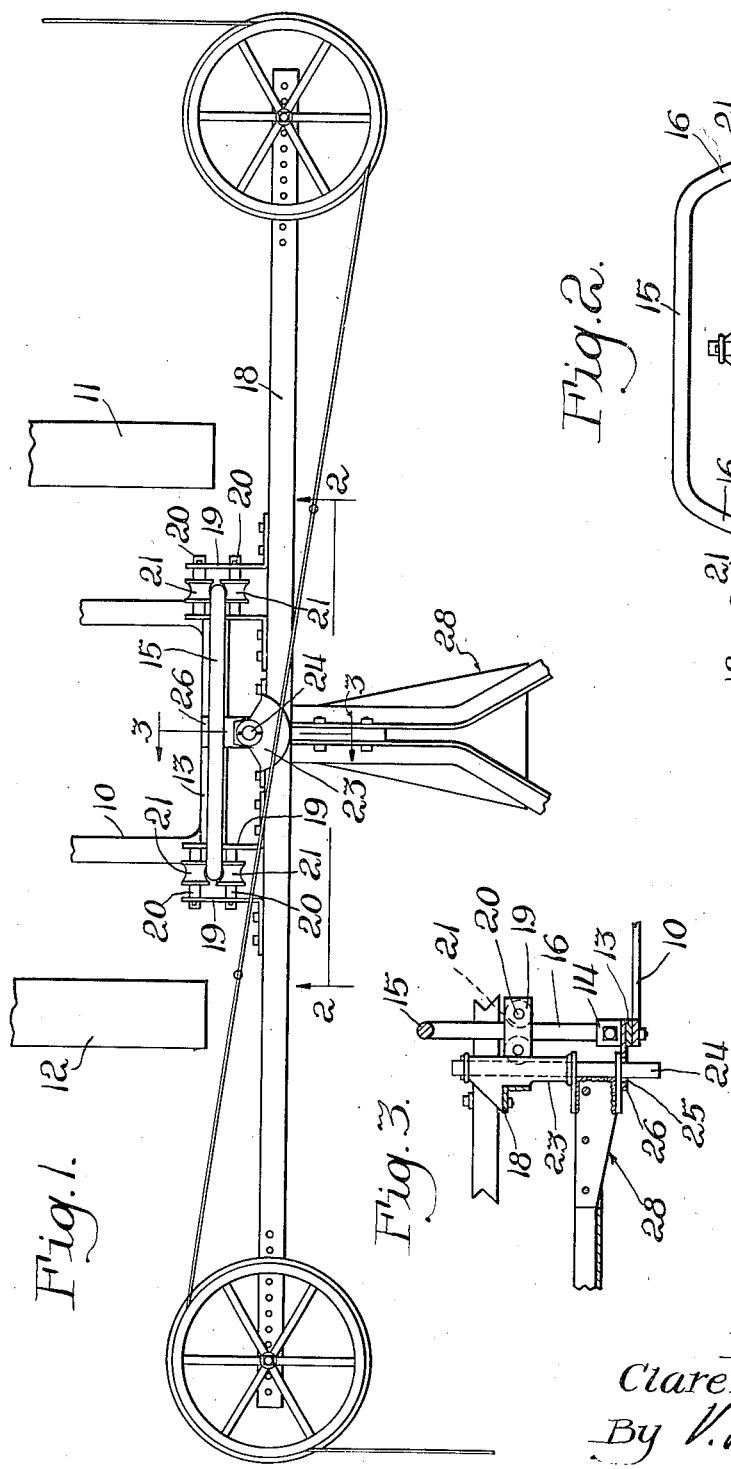
Inventor
Clarence C. Haas.
By V. F. Lavagne
Att'y.

Patented July 1, 1941

2,247,681

UNITED STATES PATENT OFFICE 2,247,681

CONNECTION FOR PLANTERS TO TRACTORS

Clarence C. Haas, Richmond, Ind., assignor to International Harvester Company, a corporation of New Jersey Application January 28, 1939, Serial No. 253,390

16 Claims. (Cl. 111—48)

This invention relates to a construction for attaching a planter to a tractor. More specifically, it relates to a universal connection for a sheave-carrying beam to the draw-bar of a tractor.

In planters of the type such as disclosed in the copending application to Alexus C. Lindgren, Serial No. 242,203, filed November 5, 1938, which has a beam of considerable length attached at the rear of the tractor upon which beam are mounted check-wire sheaves, there is the problem of the proper connection of this beam to the tractor. For the proper operation of the planter, the beam must be kept on a transverse line with respect to the tractor and yet it must be allowed some tilting movement as well as fore and aft movement, just as the planter itself has movement with respect to the tractor.

An object of the present invention is the provision of a connection for a transverse sheave-carrying beam to a tractor.

Another object of the invention is to provide a movable connection for a sheave-carrying beam to the draw-bar of a tractor.

Still another object of the invention is the provision of an attaching construction for a sheave-carrying beam to the tractor which will allow the beam a certain amount of tilting and fore and aft movement and yet maintain the beam in transverse alinement with respect to the tractor.

According to the present invention, a U-shaped member having arcuate sides is pivotally connected by its ends to the draw-bar of a tractor. A sheave-carrying beam is positioned immediately rearwardly of this U-shaped member and has attached thereto pairs of rollers which embrace the arcuate sides of the U-shaped member. A spindle is fixed to the central portion of the beam and has its lower end fitting loosely in a hole in the draw-bar of the tractor. The weight of the beam is carried on the draw-bar through the spindle. A planter attachment is also connected to the spindle. With this arrangement, the sheave-carrying beam is allowed a certain amount of lateral tilting with respect to the tractor through the movement of the rollers along the sides of the U-shaped member and a certain amount of fore and aft movement by virtue of the pivoting of the U-shaped member.

In the drawing,

Figure 1 is a plan view, showing a sheave-carrying beam as well as portions of a planter with which it is associated and the draw-bar of a tractor to which it is attached;

Figure 2 is a section taken along the line 2—2 of Figure 1; and,

Figure 3 is a section taken along the line 3—3 of Figure 1.

The reference numeral 10 designates the U-shaped draw-bar of a tractor, which is not otherwise shown except for rear wheels 11 and 12. A member 13 is bolted to the draw-bar 10 and has upstanding ends 14 to which are attached the ends of a U-shaped member 15. This member has arcuate sides 16, and extends in a vertical plane. A sheave-carrying beam 18 of considerable length is positioned rearwardly of the member 15. Pairs of bracket members 19 are secured to the beam 18 and have mounted thereon stub shafts 20, on which are mounted rollers 21. These rollers embrace the arcuate sides 16 of the U-shaped member 15. A bracket member 23 is secured at the middle of the beam 18, in which is mounted a spindle 24. The end of the spindle has a loose fit in a hole 25 in a piece 26 secured on top of the member 13. This piece in reality constitutes an extension of the draw-bar 10. A part 28 is also secured to the spindle 24 and forms the means by which the planter, not shown in the present application but described in detail in the aforementioned copending application of Alexus C. Lindgren, is attached to the draw-bar 10 of the tractor. Suffice it to say for the purposes of the present application that the planter is of the usual type comprising check-heads and seed-depositing mechanisms and has a pivotal attachment to the tractor through the connection of the part 28 with the spindle 24.

Planting is not always done over level ground. In certain cases where the tractor and planter are being driven into or out of a depression, the planter is allowed to move upwardly or downwardly with respect to the planter because of the loose fit of the pin 24 in the opening in the piece 26. The check-wire sheaves and the beam 18 carrying them should be allowed the same movement for satisfactory operation of the planter. The attachment of the beam 18 to the bracket member 23 and the spindle 24 allows the beam the same movement up and down as the planter. The movement of the sheaves and the beam 18, however, will be slightly fore and aft and this is permitted because of the pivotal attachment of the U-shaped member 15 to the draw-bar 10. In many cases, there will be some lateral tilting of the planter with respect to the tractor when the planter is moving over side sloping ground. In this event the beam 18 is also allowed to tilt from side to side, the arcuate side 16 of the U-shaped member 15 allowing the rollers 21 to move up and down. The transverse tilting of the beam 18 is effected about a center somewhat above the contact of the spindle 24 with the piece 26 because of the spindle's loose fit in the hole 25. This center will be generally on the center of curvatures of the arcuate sides 16 of the U-shaped member 15.

As is fully disclosed in the aforementioned copending application of Alexus C. Lindgren, the tractor is turned at the end of a row, and the turning of the beam 18 and check-wire sheaves with the tractor and in respect to the planter allows the release of the check-wire from the sheaves. Consequently, it is important that the beam 18 be maintained in a transverse position with respect to the tractor at all times apart from its ability to tilt laterally and fore and aft. The beam 18 is kept in the proper transverse position by virtue of its connection to the draw-bar 10 through the U-shaped bar member 15 and rollers 21. It will be seen from inspection of the drawing that the beam 18 always occupies a position parallel to the U-shaped member 15. The U-shaped member 15 is pivotally attached by its ends to the upstanding ends 14 of the member 13 attached to the draw-bar 10. The pivot axis of the member 15 is consequently on a transverse axis with respect to the tractor. Since the beam 18 is kept parallel to the member 15, the beam also pivots about the same transverse axis and consequently is kept continually transverse of the tractor and the line of draft.

It will be seen from the above description that a novel connection for a sheave-carrying beam to a tractor has been provided. By virtue of the connection, the beam is allowed certain lateral and fore and aft tilting, but has its transverse alinement with respect to the tractor maintained. The intention is to limit the invention only within the terms of the appended claims.

What is claimed is:

1. The combination with a tractor having a draw-bar having an opening, of a U-shaped member having arcuate sides and pivotally attached to the draw-bar by its ends so as to extend vertically, a sheave-carrying beam positioned in spaced parallel relation to the U-shaped member, pairs of bracket members secured to the beam and one pair being spaced from the other a distance equal to the spacing between the arcuate sides of the U-shaped member, pairs of rollers rotatably mounted between the bracket members of each pair and engaging the arcuate sides of the U-shaped member, a spindle secured to said sheave carrying beam and having an end thereof fitting loosely in the opening in the draw-bar, and a part on said spindle engaging the draw-bar.

2. The combination with a tractor having a part in which there is an opening, of a U-shaped member having arcuate sides and pivotally secured by its ends to the rear of the tractor so as to extend in a generally vertical plane, a check-wire sheave-carrying beam positioned rearwardly of and generally parallel to the U-shaped member, pairs of rollers secured to the beam in spaced relation thereto so as to embrace the arcuate sides of the U-shaped member, a spindle secured to the beam and having an end fitting loosely in said opening in the tractor, and a part on said spindle engaging the tractor.

3. The combination with a tractor, of a U-shaped member having arcuate sides and connected by its ends to the tractor, a sheave-carrying beam loosely mounted at its center on the tractor, and pairs of rollers secured to the beam and embracing the arcuate sides of the U-shaped member.

4. The combination with a tractor, of a sheave-carrying beam loosely supported at substantially its mid-point on the tractor, and means connecting the tractor and the beam for maintaining the beam in a line transverse of the tractor and arranged to provide for tilting movement of the beam from side to side and bodily movement in forward and rearward directions.

5. The combination specified in claim 4, the means including a member pivotally attached to the tractor on a substantially transverse axis.

6. The combination specified in claim 4, the means including a member pivotally attached to the tractor on a substantially transverse axis and rollers fixed with respect to the beam and engaging the member.

7. In combination, a tractor, a support on the tractor, a cross bar having check-wire sheaves at its ends, and means for connecting the bar in a position across the line of draft intermediate its ends to the support, said means arranged to provide for fore and aft tilting of the bar but serving to maintain its cross-wise position in relation to the tractor.

8. In combination, a tractor, a planter pivotally connected to the rear end of the tractor for movement in relation thereto, a sheave-carrying cross bar carried by the tractor in cooperative position in relation to the planter, and means to connect said bar to the tractor for limited universal movement.

9. The combination with a tractor, of a vertical member pivotally secured to the tractor on a transverse axis, and a sheave-carrying beam extending transversely of the tractor and connected to the member.

10. The combination with a tractor, of a substantially vertically arranged member connected to the tractor and having curved sides and a sheave-carrying beam associated with the member at its curved sides.

11. The combination with a tractor, of a vertical member pivotally connected to the tractor and having curved sides and a sheave-carrying beam extending generally paralllel to the pivot axis of the member on the tractor and associated with the member at its curved sides.

12. The combination with a tractor, of a vertical member pivotally connected to the tractor on a transverse axis, and a sheave-carrying beam extending transversely of the tractor and connected to the sides of the member for movement relative to the member.

13. The combination with a tractor, of substantially vertically arranged means pivotally connected to the tractor and having curved portions, and a sheave-carrying beam associated with the means at the curved portions.

14. The combination with a tractor, of substantially vertically arranged means pivotally connected to the tractor and having arcuate portions, and a sheave-carrying beam associated with the means at its arcuate portions for movement relative to the means and for movement with the means relative to the tractor.

15. The combination with a tractor, of means having arcuate portions pivotally connected at the rear of the tractor on a transverse axis, and a sheave-carrying beam extending transversely of the tractor at the rear thereof and connected to the means at its arcuate portions for movement with respect to the means generally in a plane which is parallel to the pivot axis of the means and for pivoting movement with the means about the axis of the means in respect to the tractor.

16. The combination with a tractor, of a planter flexibly connected at the rear of the tractor for pivotal movement, lateral tilting and up-and-down movement with respect to the tractor, means pivotally connected at the rear of the tractor on a transverse axis and having arcuate portions, and a sheave-carrying beam extending transversely of the tractor at the rear thereof and connected to the means at its arcuate portions for lateral tilting and pivoting about the transverse axis of the means in accordance with the lateral tilting and up-and-down movement of the planter and also for maintenance in a line transverse of the tractor.

CLARENCE C. HAAS.